(12) United States Patent
Kurtz

(10) Patent No.: US 8,910,592 B1
(45) Date of Patent: Dec. 16, 2014

(54) WASTE LESS HAY FEEDERS

(71) Applicant: William C. Kurtz, St. Croix Falls, WI (US)

(72) Inventor: William C. Kurtz, St. Croix Falls, WI (US)

(*) Notice: Subject to any disclaimer, the term of this patent is extended or adjusted under 35 U.S.C. 154(b) by 0 days.

(21) Appl. No.: 14/173,787

(22) Filed: Feb. 5, 2014

Related U.S. Application Data

(60) Provisional application No. 61/849,918, filed on Feb. 5, 2013.

(51) Int. Cl.
*A01K 5/00* (2006.01)
*A01K 1/10* (2006.01)

(52) U.S. Cl.
CPC .......................................... *A01K 1/10* (2013.01)
USPC ............................................ 119/60; 119/52.1

(58) Field of Classification Search
USPC ............. 119/63, 60, 59, 58, 51.12, 52.1, 57.2
See application file for complete search history.

(56) References Cited

U.S. PATENT DOCUMENTS

| | | | |
|---|---|---|---|
| 36,905 A | 11/1862 | Hawkins | |
| 42,927 A | 5/1864 | Close | |
| 45,011 A | 11/1864 | Allerton | |
| 54,371 A | 5/1866 | Lahm | |
| 62,522 A | 3/1867 | Blanchard | |
| 64,983 A | 5/1867 | Ives | |
| 69,976 A | 10/1867 | Febles | |
| 1,690,762 A | 11/1928 | Weaber | |
| 1,749,808 A * | 3/1930 | Greene | 119/61.3 |
| 2,827,876 A | 3/1958 | Trobaugh | |
| 4,706,609 A | 11/1987 | Delichte | |
| 4,930,449 A | 6/1990 | Harton | |
| 4,957,067 A | 9/1990 | Akins | |
| 5,189,985 A * | 3/1993 | Brady et al. | 119/60 |
| 5,345,895 A * | 9/1994 | Stevens et al. | 119/58 |
| 5,433,172 A * | 7/1995 | Weelink | 119/57.92 |
| 5,465,684 A | 11/1995 | Dyson | |
| 5,522,345 A * | 6/1996 | Payne | 119/60 |
| 6,550,421 B1 * | 4/2003 | Sturgis | 119/57.92 |
| 8,302,798 B2 * | 11/2012 | Moss | 220/229 |
| 2004/0139919 A1 * | 7/2004 | Dodds | 119/58 |
| 2011/0253053 A1 * | 10/2011 | Kurtz | 119/60 |
| 2013/0174788 A1 * | 7/2013 | O'Connor | 119/52.1 |

OTHER PUBLICATIONS

K. Martinson, J. Wilson, K. Cleary, W. Lazarus, W. Thomas and M. Hathaway, Round-bale feeder design affects hay waste and economics during horse feeding, J Anim Sci, 2012, 90:1047-1055.

* cited by examiner

*Primary Examiner* — Darren W Ark
*Assistant Examiner* — George Andonyan
(74) *Attorney, Agent, or Firm* — Albert W. Watkins

(57) ABSTRACT

A plurality of pliant scrapers are preferably secured to a feeder grille. The grille keeps an animal from walking in the feed. The scrapers are pliant to flex when the animal presses its head into a gap between adjacent scrapers, without causing undue pain or harm. When the animal pushes into the gap between adjacent scrapers, the pliant scrapers spread sufficiently to allow the animal's head to pass. When the animal subsequently backs out of the feeder, the pliant scrapers flip from pointing into the gap to pointing slightly out from the gap. As the animal continues to recede from the feeder, the scrapers wipe across the face and mouth of the animal. The wiping separates any unsecured hay or feed from the mouth of the animal. When the scrapers eventually separate from the animal, they spring towards the feeder interior, thereby propelling loose hay back into the feeder.

15 Claims, 5 Drawing Sheets

WASTE LESS HAY FEEDERS

CROSS REFERENCE TO RELATED APPLICATIONS

This application claims the benefit under 35 U.S.C. 119(e) of U.S. provisional patent application 61/849,918 filed Feb. 5, 2013 and herewith, of similar title and like inventorship, the contents which are incorporated herein by reference in entirety.

BACKGROUND OF THE INVENTION

1. Field of the Invention

The present invention pertains generally to animal husbandry, and more particularly to the provision of expandable feed openings in feeding devices having a guard.

2. Description of the Related Art

Throughout the ages mankind has relied upon animals as a vital source of food and raw materials. While pre-historic man is thought to have been a hunter and gatherer, reliance upon random events of nature has not been accepted by mankind. Instead, people have developed ways to keep and care for animals to ensure their availability, which provides synergistic benefit to both man and animal. This is referred to as animal husbandry, which is simply caring for the needs of animals. Animal husbandry is very old, almost certainly pre-dating any written histories.

A critical component of animal husbandry is providing a food source for the animals, regardless of the season. In many locales and climates, this will generally require the gathering and storing of food to carry the animals through inclement seasons and periods of weather. One way this is practiced is by growing a crop that is abundant beyond the immediate or short term needs of the animals during milder seasons. The excess crops are then collected or harvested for consumption or storage until needed. A typical crop for ruminant animals is hay that is cut, dried, and then baled.

During periods where ruminant animals such as cattle are unable to forage for grasses, alfalfa or other suitable foods, a farmer will move one or more hay bales into the field. The bale may simply be dropped onto the ground, and the animals will gather around the bale and eat the hay. Unfortunately, many of these animals will selectively pick the most desirable hay out of the bale, and will commonly drop the rest onto the ground. Since the animals are congregated next to the bale, any hay that is dropped tends to be trampled into the ground, ultimately to spoil and become waste. The percentage of hay dropped by the animals is surprisingly high, and can typically amount to more than half of the feed. Clearly, such large losses of feed are undesirable.

To reduce the amount of wasted hay or other feedstock, a number of animal feeders and racks have been devised. A common type of feeder has a plurality of generally vertically extending bars, resembling a grille or jail bars. The animal will necessarily insert their head between the bars in order to reach the feed. Since only their head will preferably pass through the bars, the animals are prevented from directly trampling the feed. Furthermore, any loose feed that drops from their mouths or falls when they are biting adjacent feed will preferably fall inside the feeder perimeter. This dropped feed may then be eaten by the animals at a later time, with less spoilage than if the animals were given unrestricted access to the feed. Furthermore, these types of feeders also help reduce crowding between animals, such as one animal crowding another out from the feed. Exemplary patents that illustrate this "jail bar" or grille type of feeder or rack, the teachings which are incorporated herein by reference, include U.S. Pat. No. 36,905 by Hawkins, entitled "Sheep rack"; 42,927 by Close, entitled "Feed rack"; 45,011 by Allerton, entitled "Sheep rack"; 54,371 by Lahm, entitled "Sheep rack"; 62,522 by Blanchard, entitled "Feed rack"; 64,983 by Ives, entitled "Sheep rack"; 69,976 by Febles, entitled "Combined sheep rack and trough"; and U.S. Pat. No. 2,827,876 by Trobaugh, entitled "Poultry feeder". As may be apparent from the foregoing patents, these types of feeders may be stationary, movable, or may be provided as wheeled, mobile vehicles.

U.S. Pat. No. 1,690,762 by Weaber, entitled "Hog trough", the teachings and contents which are incorporated herein by reference, illustrates collapsible partitions that perform a similar function for hog troughs. U.S. Pat. No. 4,930,449 by Harton, entitled "Portable hay feeder", the teachings and contents which are incorporated herein by reference, illustrates a covered feeder having swinging gates which are sized to prevent the animals from reaching their heads through. Instead, the animals must swing the gates and eat through them, presumably containing the feed within the feeder. Delichte in U.S. Pat. No. 4,706,609, entitled "Livestock feeder for cylindrical bales", the teachings and contents which are incorporated herein by reference, discloses a plurality of inclined outer bars and an inner frame. The outer frame also includes a skirt adjacent the ground that further prevents the animals from undesirably trampling the feed. A hay bale is placed within the inner frame, and as animals feed, the gap between inner and outer frames serves as a collector for dropped feed that is protected from trampling. U.S. Pat. No. 4,957,067 to Akins, entitled "Feeder for animals", the teachings and contents which are incorporated herein by reference, discloses a plurality of inwardly bent bars that again help to drop the feed within the feeder, while reducing contact between the animal's shoulders and the feeder. U.S. Pat. No. 5,465,684 to Dyson, entitled "Hay feeder for livestock", the teachings and contents which are incorporated herein by reference, discloses a sheet plastic feeder that is designed to flex rather than break when an animal applies large forces thereto.

Each of these prior art grill-type feeders suffer from a common limitation. The grill must be sized to correspond to the size of the animal's head. As may be apparent, adult animals vary in size, as do juveniles, and juveniles differ in size from adults. Consequently, these prior art feeders must be sized to the particular animals, and to whether the feeder is serving calves, for example, or cows. As will be appreciated, the animals themselves do not know or appreciate that one feeder is designed for them, while another is not. Since juveniles tend to be smaller, they may easily pass their head through an adult feeder, and in some cases might be able to pass more of their body through, such as one or both of their front hooves. This can lead to adult animals getting their heads trapped or entangled in a juvenile feeder, and juveniles entering into the feed area of an adult feeder and becoming entrapped therein. As a result, the farmer may have to separate the herd based upon animal size, and may further be required to purchase feeders of different sizes for different sizes of animals. Nevertheless, the improved collection and protection of loose hay far outweighs the disadvantages, and these types of feeders have become preferred equipment to reduce feed waste.

Reducing feed waste not only has the apparent benefit of reducing the amount of feed that must be provided to the animals for the growth and development, but also in the amount of waste that must be removed from the vicinity of the feeder. In other words, not only does higher feed waste require the acquisition of more feed, it also requires the removal of greater volumes of waste as well.

In the Journal of Animal Science, a plurality of researchers from the University of Minnesota reported their results obtained from testing various horse feeders. The article, authored by Martinson et al and entitled "Round-bale Feeder Design Affects Hay Waste and Economics During Horse Feeding," was published in 2012 in volume 90 on pages 1047-1055, the teachings and contents which are incorporated herein by reference. The present inventor's horse feeder reduced the mean percentage of hay waste to the lowest of any of the nine feeders tested, at five percent. In contrast, the no-feeder control experienced a 57 percent hay waste. The authors identified that feeders that did not allow the horses to immerse their heads into the bale, and instead limited them to pulling small mouthfuls from the bale, had less feed waste. While this technique has proven to be immensely beneficial in reducing feed waste, the present invention seeks to further reduce feed waste, and to provide a feeder that is compatible with a wide variety of animal species and sizes.

While my horse feeder used in the test limits horses to only get their noses in through the rods, cattle require much wider openings. This is due in part to the ability of cattle to put their head into a narrow opening, but from which they cannot always get their head back out.

In addition to the foregoing patents and article, Webster's New Universal Unabridged Dictionary, Second Edition copyright 1983, is incorporated herein by reference in entirety for the definitions of words and terms used herein.

SUMMARY OF THE INVENTION

In a first manifestation, the invention is an animal feeder defining a perimeter adapted to operatively contain feed and adapted to operatively block the ingress of a body of an animal. The perimeter has openings adapted to operatively allow a head of the animal to pass and operatively consume feed. The improvement comprises a pliant material adjacent to and interior of the perimeter openings adapted to contact and scrape the animal head while the animal head is within the opening.

In a second manifestation, the invention is a waste less feeder that is adapted to operatively deliver hay to a variety of animal species of diverse sizes with minimal waste. The feeder comprises a grille adapted to operatively preventingress of an animal body while permitting passage of an animal head there through. A hay receptacle is generally circumscribed by the grille and is accessible by the animal head passing through the grille. A resilient scraper is adapted to operatively couple the animal head to the grille whenever the animal head passes through the grille.

In a third manifestation, the invention is a method of automatically cleaning hay from an animal feeding at a feeder. According to the method, a resilient scraper adjacent an opening into the hay within the feeder is engaged with the animal, responsive to the animal feeding. Energy is stored within the resilient scraper responsive to movement of the animal relative to the opening. The stored energy is discharged responsive to removal of the animal relative to the opening.

OBJECTS OF THE INVENTION

Exemplary embodiments of the present invention solve inadequacies of the prior art by providing a plurality of pliant scrapers in combination with an otherwise relatively rigid prior art feeder. The scrapers are preferably secured to the grille, and are sufficiently pliant to operatively flex when an animal presses its head into a gap between adjacent scrapers. When the animal pushes into the gap, the pliant material of the scrapers spreads sufficiently to allow the animal's head to pass there between. When the animal subsequently backs out of the feeder, the pliant scrapers flip and wipe across the face and mouth of the animal, tending to separate any unsecured hay or feed from the mouth of the animal. With a sufficiently resilient scraper, when the animal's mouth and snout finally separate from the scraper, the scraper will spring towards the interior of the feeder, thereby flinging any residual feed carried on the scraper back into the feeder interior. Alternatively or preferably additionally, when the present scrapers are used in association with a feeder having a suitable slope or bend, the separated hay will then drop into the protected area of the feeder, permitting the feed to be consumed later, rather than wasted.

A first object of the invention is to enable a single grille type feeder to be used successfully and with minimal alteration to feed a wide variety of animal species having diverse physical sizes. A second object of the invention is to reduce feed waste and the associated need for waste removal to very low levels. Another object of the present invention is to provide an apparatus that can be coupled with many different prior art feeders to achieve the aforementioned objects. A further object of the invention is to reduce the likelihood of an animal becoming trapped or entangled in a feeder. Yet another object of the present invention is to encourage the animals to keep their heads in the feeder, rather than withdrawing their head from the feeder while eating.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
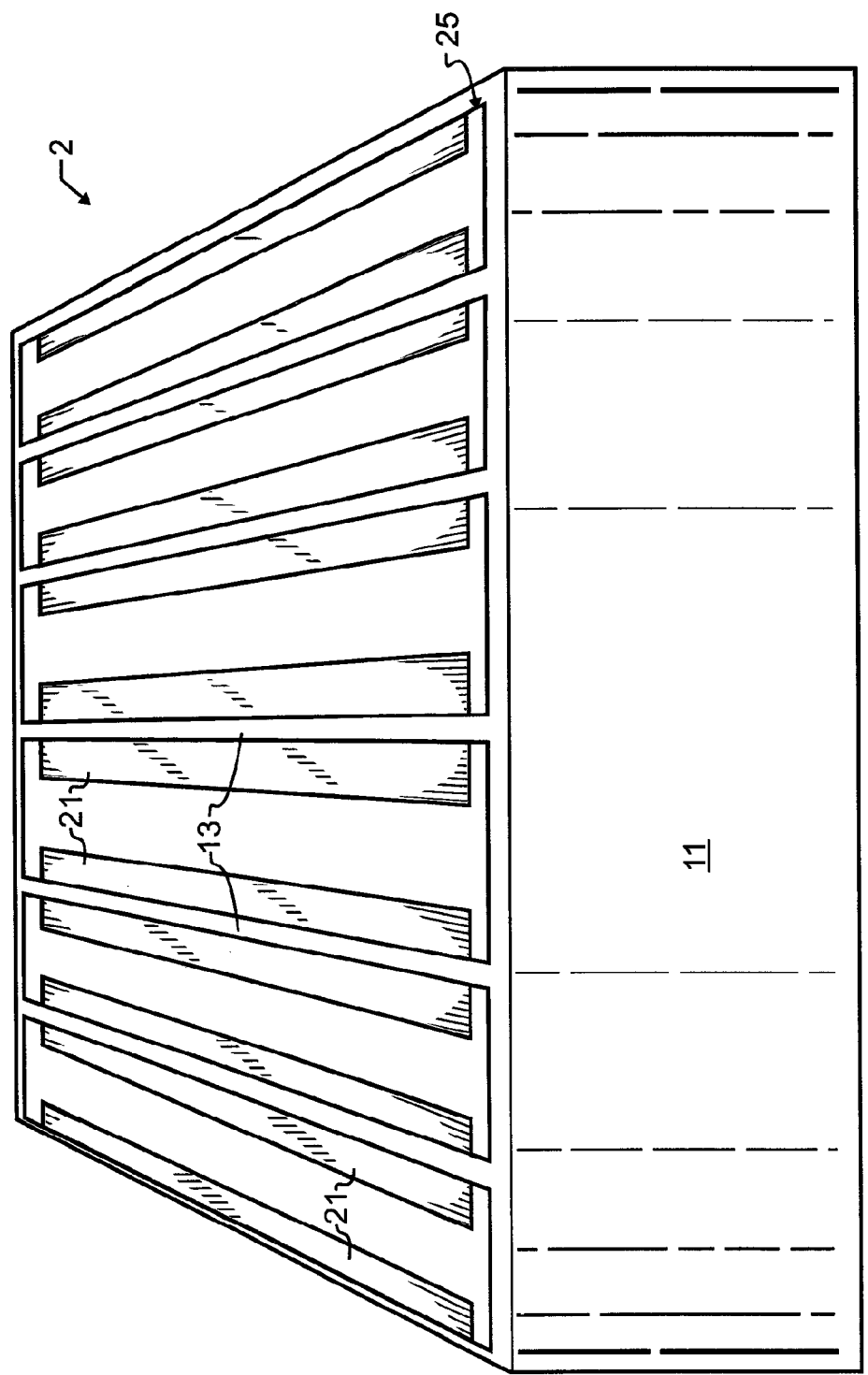
FIG. 1 illustrates a preferred embodiment wiper designed in accord with the teachings of the present invention in combination with a first feeder construction, from a side elevational view.
Figure 2:
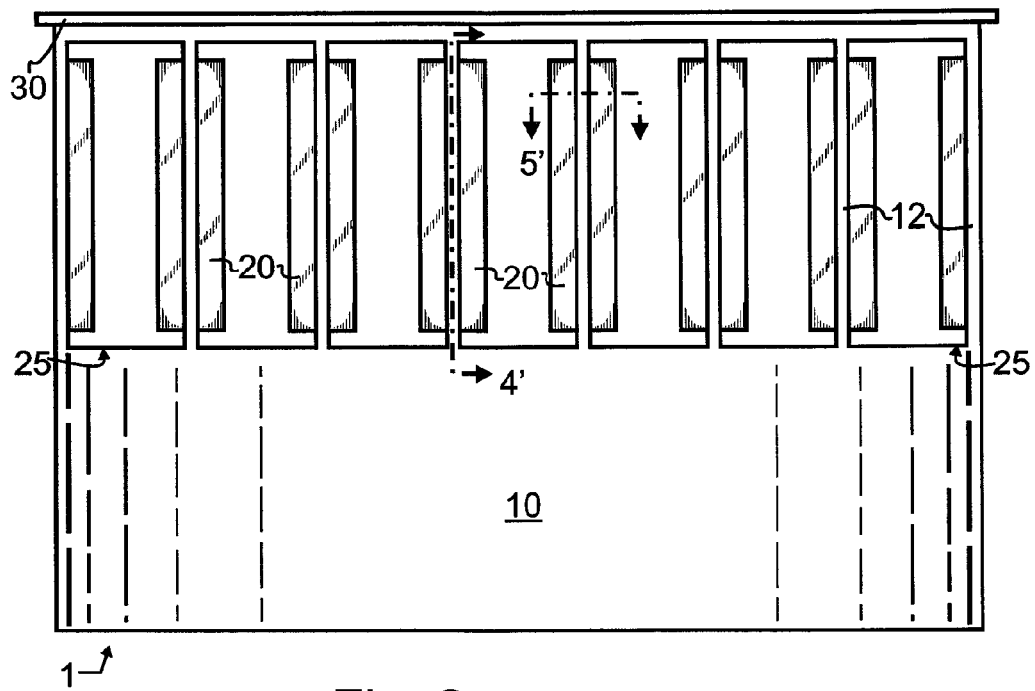
FIG. 2 illustrates the preferred embodiment wiper of FIG. 1 in combination with a second feeder construction, from a side elevational view.
Figure 3:
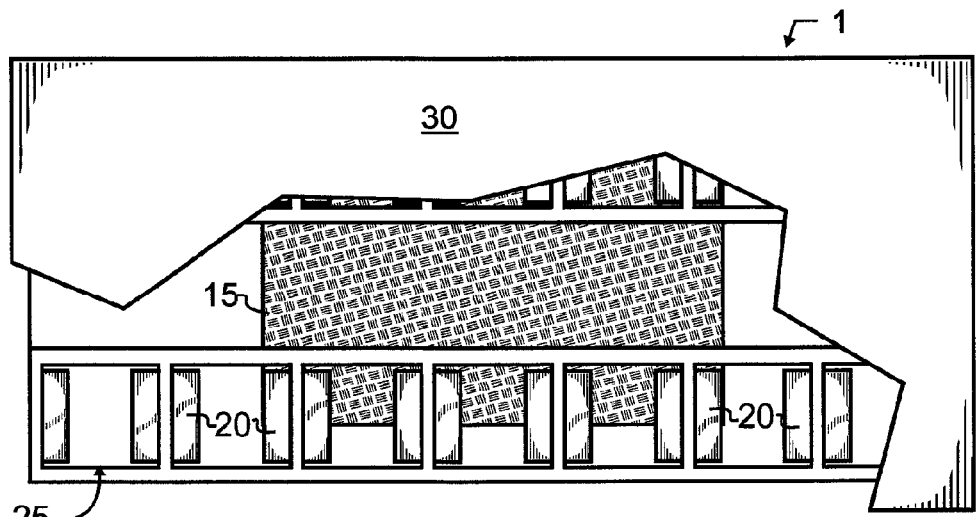
FIG. 3 illustrates the combination wiper and second feeder construction of FIG. 2 from a top, partially cut-away view.

Manifested in the preferred embodiment, the present invention enables a single feeder such as feeder 2 of FIG. 1 or feeder 1 of FIGS. 2 and 3 to be used with many different and diverse animal species, including cows, sheep, goats, deer, lama, camels and others. A feeder 2 may have a bottom skirt 11 which encircles hay or other similar feed, thereby preventing an animal 3 from stepping on the hay held therein. Rising from skirt 11 are a plurality of bars, straps, strips or similar riser bars 13 such as are known in the prior art or incorporated herein above by reference. The spacing between adjacent straps 13 defines the maximum width of each opening 25 through which an animal may feed. Since riser bars 13 are preferably sufficiently rigid to keep a hungry animal from pressing into and burying its head in the hay, these riser bars 13 will also limit or control the upper size limit of animal that may be accommodated by feeder 2. Consequently the spacing between riser bars 13 will preferably be sufficiently large to allow openings 25 to adequately accommodate the largest of animals 3 that feeder 2 will be used in association with.

Figure 5:
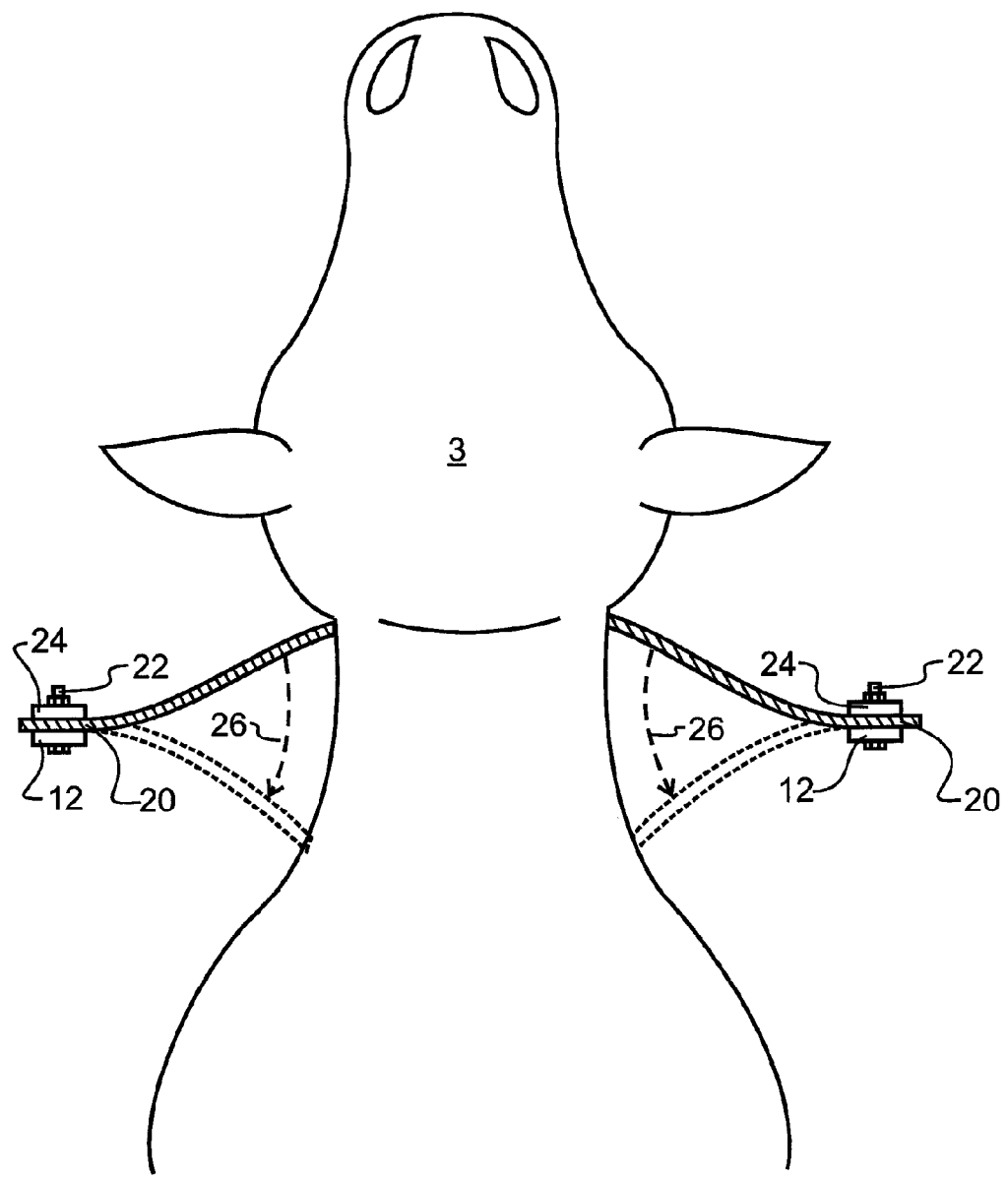
FIG. 5 illustrates the combination wiper and second feeder construction of FIG. 2 from a sectional view taken along section line 5' of FIG. 2, and further illustrating an animal in a feeding position therein.
Figure 6:
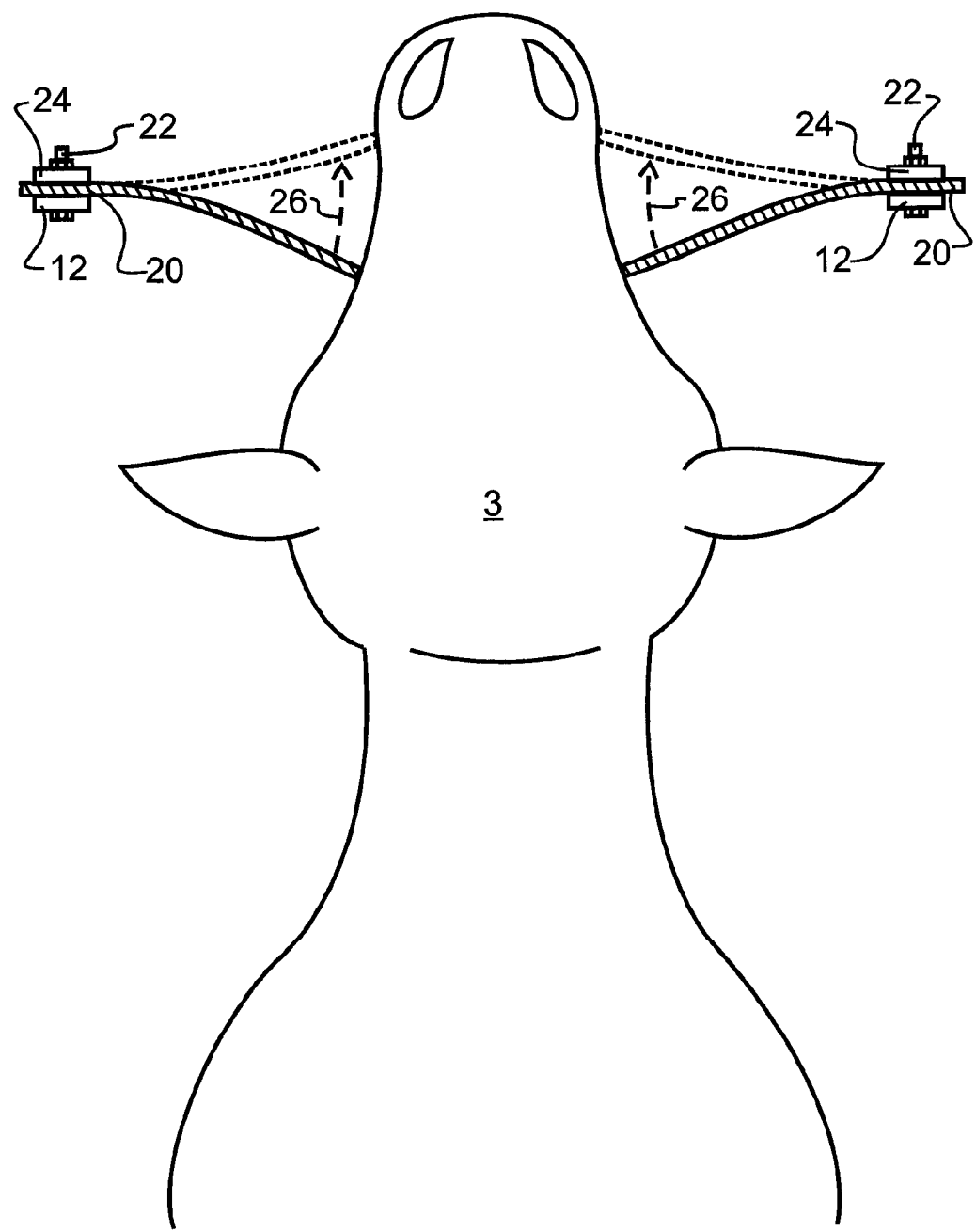
FIG. 6 illustrates the combination wiper and second feeder construction of FIG. 2 from a sectional view taken along section line 5' of FIG. 2, and further illustrating an animal in a feeding position therein, but almost entirely retracted from the feeder.

Adjacent to and preferably securely coupled with each riser bar 13 is at least one scraper 21. Preferably, each scraper 21 is double-ended, meaning that a single scraper 21 will be used to cover a portion of each of two adjacent openings 25. Nevertheless, it will be understood and apparent to those reasonably skilled in the art that each side of each opening 25 may be provided with a single scraper 21. In accord with the preferred embodiment, each scraper 21 may be fabricated from any suitable semi-rigid or pliant material that will deform when an animal that the preferred embodiment feeder is designed to serve presses its head therein, and that will do so without harming or consequentially hurting the animal. In the preferred embodiment, which is designed for cattle and other ruminants, a suitable material is one commonly used in the fabrication of strap, hose or belting, and might for exemplary purpose comprise fabric-reinforced rubber or similar materials. In alternative embodiments, rubber, neoprene, and other elastomeric materials are contemplated. Furthermore, and with the discussions throughout the present specification, it will also be apparent that scrapers 21 may in fact be comprised primarily of relatively rigid material, so long as they are provided with suitable hinges or other compliant or resilient material adjacent to riser bars 13, to allow scrapers 21 to flip forward and backward as illustrated in FIGS. 5 and 6.

Nevertheless, a fabric reinforced rubber has the advantages of being extremely durable while permitting flexure through the body of the scraper. This flexure can be important to accommodate the differing dimensions that are found throughout the animal's head and neck.

In a yet further alternative embodiment contemplated herein, scrapers 21 do not have to be continuous sheets, and instead may be provided with one or a plurality of cuts, such as horizontally extending cuts that extend partially from the vertical scraper edges towards but not extending completely to riser bars 13. Such a scraper will appear to have a plurality of fingers extending horizontally into each opening 25. Nevertheless, and as will be described herein below, the geometry and features formed into scrapers 21 will most preferably be matched to the materials that used in the fabrication of scrapers 21. Where a particularly stiff material is used, there may be a need for additional features such as the horizontal cuts or hinges described herein to avoid harm to the animals. However, where a relatively more pliant material is used, then to obtain sufficient scraping, a solid and even relatively thicker contiguous sheet may be used to fabricate scrapers 21.

The riser bars 13 of feeder 2 are sloped towards the center thereof, meaning the top diameter of feeder 2 is smaller than the diameter of skirt 11. Scrapers 21 are therefore also offset from vertical. Consequently, when an animal 3 removes its head from between adjacent scrapers 21, any hay scraped therefrom will drop back into feeder 2.

While a generally circular feeder 2 is illustrated in the preferred embodiment, the present invention is not solely limited thereto, and a wide variety of feeders may be used. This is illustrated in FIGS. 2 and 3, which illustrate a generally rectangular feeder 1 from side and top partially sectioned views, respectively. Feeder 1 may be provided with a skirt 10 having riser bars 12 extending vertically therefrom. Adjacent riser bars 12 define the size of each opening 25. A plurality of scrapers 20 most preferably are coupled with riser bars 12, and are operative in the same manner as scrapers 21 of feeder 2. A cover 30 may be provided over the top of feeder 1 to protect hay or other feed 15 from the vagaries of weather.

While two different feeders 1, 2 are explicitly illustrated and described herein, it will be understood that the present invention is applicable to nearly any feeder that incorporates riser bars 12, 13 or that otherwise have feed openings 25 that define an access through which an animal will pass its head to feed, but which will also block the ingress of the full animal 3 or the animal's hooves. This will further include stationary, portable, and mobile feeders. The rigid border, frame or framework with openings 25 that blocks the ingress of animal 3 is, in accord with the teachings of the present invention, provided with a pliant material that defines scrapers 20, 21, and which permits ingress of the head of an animal 3 for feeding.

Figure 4:
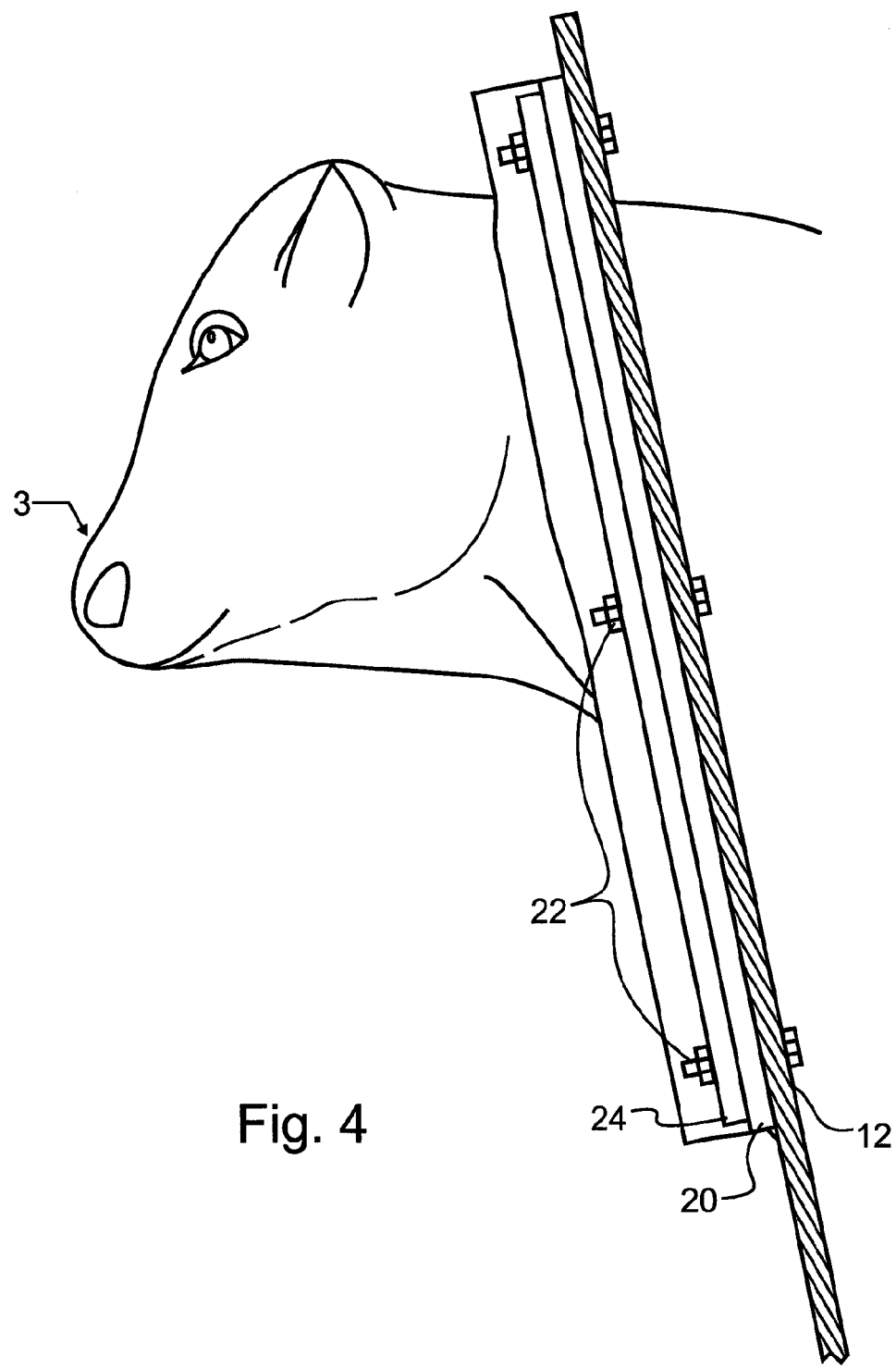
FIG. 4 illustrates the combination wiper and second feeder construction of FIG. 2 from a sectional view taken along section line 4' of FIG. 2, and further illustrating an animal in a feeding position therein.

FIGS. 4 and 5 illustrate one preferred mounting of scrapers 20 to riser bars 12, where a backing plate 24 is provided that may be fastened using fasteners 22 to riser bar 12. Most preferably, scrapers 20 are captured by these backing plates 24 and thereby secured to riser bars 20. While this method of securing scrapers 20 to riser bars 12 is preferred, it will be understood from the present disclosure that any suitable method of securing may be used, and may for exemplary purposes only, and not solely limiting the present invention thereto, include hardware fasteners, adhesives and chemical bonding.

FIG. 5 further illustrates the movement of preferred scrapers 20 as animal 3 moves its head into and out of feeder 1. As illustrated therein, scrapers 20 will preferably flex in the direction of motion of animal 3. Consequently, when animal 3 is reaching its head into feeder 1 to eat hay 15, scrapers 20 will also deflect inward towards hay 15. When animal 3 first touches scrapers 20, it will be with the snout or nose. This causes the initial deflection of scrapers 20 inwards. Consequently, any movement forward after that initial deflection will result in the scraper applying forces inward. This is significant because the animal's eyes, ears, and any ear tags that may be attached will all be gently pushed in, rather than being pulled off or away from the animal.

When animal 3 then retreats or begins to move away from hay 15, scrapers 20 will move or flip in the direction illustrated by dashed lines 26, and will flex backward as illustrated therein. The flip will occur within the region of the animal's neck or adjacent the base of the skull, long before the scrapers will contact any sensitive or protruding body parts. The slight rearward orientation of scrapers 20 as shown by dashed line in FIG. 5 allows animal 3 to more comfortably back out of opening 25. As the animal moves, scrapers 20 will once again primarily be pressing inward towards the animal's body. As a result, there will be no pulling, and loose apparatus such as ear tags will stay attached to the animal.

However, as animal 3 does back out, scrapers 20 will also preferably remain reasonably firmly engaged against animal 3. This means that any hay or other feed 15 that might be sticking out of the mouth of animal 3 will be scraped by scrapers 20 and knocked therefrom into the interior of feeder 1, prior to being removed from and dropped outside of feeder 1.

FIG. 6 illustrates animal 3 in a feeding position therein, but in the process of and almost entirely retracted from the feeder.

Scrapers 20 are very desirably sufficiently resilient to follow the surface of the head of animal 3. Also very desirably, just as animal 3 finishes withdrawing its head from between scrapers 20, then scrapers 20 will rapidly release energy and return to an unloaded position where scrapers 20 adjacent to each other are generally flat and co-planar, not tending inward or outward. This is illustrated by dashed motion arrows 26 in FIG. 6, and the dashed lines showing the sprung position of scrapers 20. A significant benefit and advantage of this stored energy being rapidly released arises from the path and motion that scrapers 20 travel through. The portion of a ruminant animal that will last be removed is the area adjacent to the mouth and nose. This is, of course, also the area where loose or excess hay will protrude. As scrapers 20 wipe over this region, they may lift, free up, or otherwise detach loose hay. As already aforementioned, riser bars 12 are preferably sloped inward, which means that feed scraped from animal 3 will be tracked back into feeder 1. With the final spring of scrapers 20 from adjacent the mouth of animal 3, loose feed that scrapers 20 pick up or remove will be propelled by the release of this spring energy back into the interior of feeder 1.

A pliant scraper 20, 21 will, as aforementioned, be able to accommodate slight variations in the geometry of the animal's head and neck, and so is preferred. Nevertheless, and as also aforementioned, a close inspection of FIG. 5 will reveal that there is substantial flexure of scrapers adjacent to riser bars 12. A mechanical hinge, thinned region, or any other suitable feature that enables flexure may be provided adjacent to riser bars 12.

In an alternative embodiment, hoses, rubber straps or other pliant, resilient, or elastomeric materials may be secured directly to the top and bottoms of openings 25, and not be fastened at all to riser bars 12. Since the purpose of riser bars 12 is to block ingress of animal 3, and since the purpose of scraper 20 is to permit ingress of the head of animal 3, the two components do not need to be directly coupled together.

While a variety of materials have already been described with reference to scrapers 21, most preferably a selected material will be sufficiently durable to withstand both the vagaries of weather and the very consequential forces that might be applied thereto by a large and hungry animal 3.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. An animal feeder comprising a plurality of riser bars defining a perimeter and adapted to operatively contain feed in an interior thereof and adapted to operatively block the ingress of a body of an animal into said interior, said perimeter having openings adapted to operatively allow a head of said animal to pass and operatively consume said feed, wherein the improvement comprises a plurality of pliant sheets, wherein each said plurality of pliant sheets is rectilinear in form affixed longitudinally along at least one of said plurality of riser bars and having first and second major surfaces and an edge partially blocking at least one of said perimeter openings, said sheet edge adapted to remain in contact with and scrape said animal head while said animal head is within said at least one of said perimeter openings.

2. The animal feeder of claim 1, wherein said plurality of pliant sheets flex into said interior of said perimeter when said animal head is within said at least one of said perimeter openings and moving towards feed.

3. The animal feeder of claim 1, wherein said plurality of pliant sheets flex to an exterior of said perimeter when said animal head is within said at least one opening and moves away from said feed.

4. The animal feeder of claim 1, wherein said plurality of pliant sheets further comprise an elastomeric material.

5. The animal feeder of claim 1, wherein said each one of said plurality of pliant sheets further comprises a second edge partially blocking a second one of said perimeter openings adjacent to said at least one of said perimeter openings, said second edge distal to said edge, and said each one of said plurality of pliant sheets secured to said at least one of said plurality of riser bars between said edge and said second edge.

6. A waste less feeder adapted to operatively deliver hay to a variety of animal species of diverse sizes with minimal waste, comprising:
 a grille comprising a plurality of riser bars adapted to operatively prevent ingress of an animal body while permitting passage of an animal head there through;
 a hay receptacle generally circumscribed by said grille and accessible by said animal head passing through said grille; and
 a plurality of rectilinear resilient scraper sheets, each one of said plurality of resilient scraper sheets affixed longitudinally co-extensive with said at least one of said plurality of riser bars and extending in a plane defined by said grille and at least partially closing at least one opening through said grille and adapted to operatively couple with said animal head and with said grille whenever said animal head passes through said grille.

7. The waste less feeder of claim 6, wherein said resilient scraper sheet is adapted to operatively flex toward an interior of said grille when said animal head moves towards said hay receptacle.

8. The waste less feeder of claim 6, wherein said resilient scraper sheet is adapted to operatively flex toward an exterior of said grille when animal head moves away from said hay receptacle.

9. The waste less feeder of claim 6, wherein said resilient scraper sheet is adapted to operatively resiliently maintain contact with said animal head while said animal head passes through said grille.

10. The waste less feeder of claim 6, wherein said resilient scraper sheet is adapted to operatively store energy when said animal head moves away from said hay, and is adapted to operatively release said stored energy in a short burst by suddenly flexing from an exterior of said grille towards an interior when said animal head disengages therefrom, and is thereby adapted to operatively propel any hay scraped by said resilient scraper sheet into said hay receptacle.

11. The waste less feeder of claim 6, wherein said resilient scraper sheet further comprises first and second major surfaces and an edge, said resilient scraper sheet edge adapted to operatively couple with said animal head whenever said animal head passes through said grille.

12. The waste less feeder of claim 6, wherein said resilient scraper sheet further comprises an elastomeric material.

13. The animal feeder of claim 5, wherein each one of said plurality of riser bars has a single one of said plurality of pliant sheets affixed thereto and partially blocking adjacent perimeter openings adjacent to and on two opposed sides of said each one of said plurality of riser bars.

14. A waste less feeder adapted to operatively deliver hay to an animal having a body and head, comprising:
 a grille having first and second riser bars defining a first opening there between, said first opening adapted to operatively prevent passage of said animal body through said first opening while large enough to operatively permit passage of said animal head;

a hay receptacle generally circumscribed by said grille and accessible by said animal head passing through said first opening; and first and second elastomeric scraper sheets extending in a plane defined by said grille, each of said first and second elastomeric scraper sheets having first and second major surfaces and a scraper edge defining a longitudinally extensive rectilinear sheet, said first elastomeric scraper sheet affixed to and longitudinally co-extensive with said first riser bar and at least partially closing said first opening through said grille and adapted to operatively couple through said first elastomeric scraper sheet scraper edge with said animal head whenever said animal head passes through said grille, said second elastomeric scraper sheet affixed to and longitudinally co-extensive with said second riser bar and at least partially closing said first opening through said grille and adapted to operatively couple through said second elastomeric scraper sheet scraper edge with said animal head whenever said animal head passes through said grille.

15. The waste less feeder of claim 14, wherein said first and second elastomeric scraper sheets are adapted to operatively store energy when said animal head moves away from said hay, and are adapted to operatively release said stored energy in a short burst by suddenly flexing from an exterior of said grille towards an interior when said animal head disengages therefrom, and are thereby adapted to operatively propel any hay scraped by said first and second elastomeric scraper sheet scraper edges into said hay receptacle.

* * * * *